United States Patent [19]

Gelinas

[11] 4,432,098

[45] Feb. 14, 1984

[54] APPARATUS AND METHOD FOR TRANSFER OF INFORMATION BY MEANS OF A CURL-FREE MAGNETIC VECTOR POTENTIAL FIELD

[75] Inventor: Raymond C. Gelinas, Concord, Mass.

[73] Assignee: Honeywell Inc., Minneapolis, Minn.

[21] Appl. No.: 198,324

[22] Filed: Oct. 20, 1980

[51] Int. Cl.³ .............................................. H04B 5/00
[52] U.S. Cl. ....................................................... 455/41
[58] Field of Search ................... 329/200, 203, 205 R, 329/207; 324/248, 83 D; 332/51 R, 51 H; 455/39, 41

[56] References Cited

U.S. PATENT DOCUMENTS 3,363,200 1/1968 Jaklevic et al. .................... 332/51 R

OTHER PUBLICATIONS

Rosen et al., "Magnetic Recordings of the Heart's Electrical Activity with a Cryogenic Magnetometer," Journal of Applied Physics, vol. 42, #10, Sep. 71, pp. 3682-3684.

Primary Examiner—Siegfried H. Grimm
Assistant Examiner—Edward P. Westin
Attorney, Agent, or Firm—W. W. Holloway, Jr.; J. P. Sumner; A. Medved

[57] ABSTRACT

A system for transmission of information using a curl-free magnetic vector potential radiation field. The system includes current-carrying apparatus for generating a magnetic vector potential field with a curl-free component coupled to apparatus for modulating the current applied to the field generating apparatus. Receiving apparatus includes a detector with observable properties that vary with the application of an applied curl-free magnetic vector potential field. Analyzing apparatus for determining the information content of modulation imposed on the curl-free vector potential field can be established in materials that are not capable of transmitting more common electromagnetic radiation.

8 Claims, 7 Drawing Figures

APPARATUS AND METHOD FOR TRANSFER OF INFORMATION BY MEANS OF A CURL-FREE MAGNETIC VECTOR POTENTIAL FIELD

RELATED APPLICATIONS

Apparatus and Method for Distance Determination by Means of a Curl-Free Magnetic Vector Potential Field, invented by Raymond C. Gelinas, Ser. No. 198,326, filed on Oct. 20, 1980 and assigned to the same assignee as named herein.

Apparaus and Method for Direction Determination by Means of a Curl-Free Magnetic Vector Potential Field, invented by Raymond C. Gelinas, Ser. No. 198,553, filed on Oct. 20, 1980 and assigned to the same assignee as named herein.

Apparatus and Method for Demodulation of a Modulated Curl-Free Magnetic Vector Potential Field, invented by Raymond C. Gelinas, Ser. No. 198,325, filed on Oct. 20, 1980 and assigned to the same assignee as named herein.

Apparatus and Method for Modulation of a Curl-Free Magnetic Vector Potential Field, invented by Raymond C. Gelinas, Ser. No. 198,380, filed on Oct. 20, 1980 and assigned to the same assignee as named herein.

BACKGROUND OF THE IVENTION

1. Field of the Invention

This invention relates generally to the transfer of information by means of an electromagnetic field, and more particularly to the transfer of information by a component of the magnetic vector potential field.

2. Description of the Prior Art

It is known in the prior art to provide systems for the transfer of information utilizing electromagnetic fields which are solutions to Maxwell's equations. These information transfer systems include apparatus for generating modulated electromagnetic fields and apparatus for detecting and demodulating the generated electromagnetic fields. Examples of the prior type information transfer systems include radio and television band-based systems, microwave band-based systems and optical band-based systems.

The Maxwell equations, which govern the prior art transfer of information by electromagnetic fields can be written:

$$\text{CURL } \overline{E} + \frac{\partial \overline{B}}{\partial t} = 0 \qquad 1.$$

$$\text{CURL } \overline{H} - \frac{\partial \overline{D}}{\partial t} = \overline{J} \qquad 2.$$

$$\text{DIV } \overline{B} = 0 \qquad 3.$$

$$\text{DIV } \overline{D} = \rho \qquad 4.$$

where $\overline{E}$ is the electric field density, $\overline{H}$ is the magnetic field intensity, $\overline{B}$ is the magnetic flux density, $\overline{D}$ is the electric displacement, $\overline{J}$ is the current density and $\rho$ is the charge density. In this notation the bar over a quantity indicates that this is a vector quantity, i.e., a quantity for which a spatial orientation is required for complete specification. The terms CURL and DIV refer to the CURL and DIVERGENCE mathematical operation and can be denoted by the $\nabla \times$ and $\nabla \cdot$ mathematical operators. The magnetic field intensity and the magnetic flux density are related by the equations $\overline{B} = \mu \overline{H}$, while the electric field density and the electric displacement are related by the equation $\overline{D} = \epsilon \overline{E}$. These equations can be used to describe the transmission of electromagnetic radiation through a vacuum or through various media.

It is known in the prior art that solutions to Maxwell's equations can be obtained through the use of electric scalar potential functions and magnetic vector potential functions. The electric scalar potential is given by the expression:

$$\phi(1) = \frac{1}{4\pi\epsilon_0} \int \frac{\rho(2)}{r_{12}} dv(2) \qquad 5.$$

where $\phi(1)$ is the scalar potential at point 1, $\rho(2)$ is the charge density at point 2, $r_{12}$ is the distance between point 1 and 2, and the integral is taken over all differential volumes. The magnetic vector potential is given by the expression:

$$\overline{A}(1) = \frac{1}{4\pi\epsilon_0 C^2} \int \frac{\overline{J}(2)}{r_{12}} dv(2) \qquad 6.$$

where $A(1)$ is the vector potential at point 1, $\epsilon_0$ is the permittivity of free space, C is the velocity of light, $J(2)$ is the (vector) current density at point 2, $r_{12}$ is the distance between point 1 and point 2 and the integral is taken over all differential volumes $dv(2)$. The potential functions are related to Maxwell's equations in the following manner:

$$\overline{E} = -\text{GRAD } \phi - \frac{\partial \overline{A}}{\partial t} \qquad 7.$$

where GRAD is the gradient mathematical operation and can be denoted by the $\nabla$ mathematical operator.

$$\overline{B} = \text{CURL } \overline{A} \qquad 8.$$

where A can contain, for completeness, a term which is the gradient of a scalar function. In the remaining discussion, the scalar function and the scalar potential function will be taken to be substantially zero. Therefore, attention will be focused on the magnetic vector potential $\overline{A}$.

In the prior art literature, consideration has been given to the physical significance of the magnetic vector potential field $\overline{A}$. The magnetic vector potential field was, in some instances, believed to be a mathematical artifice, useful in solving problems, but devoid of independent physical significance.

More recently, however, the magnetic vector potential has been shown to be a quantity of independent physical significance. For example, in quantum mechanics, the Schroedinger equation for a (non-relativistic, spinless) particle with charge q and mass m moving in an electromagnetic field is given by $$-\frac{\hbar}{i} \frac{\partial \psi}{\partial t} = \qquad 9.$$

$$-\frac{1}{2m} \left( \frac{\hbar}{i} \text{GRAD} - q\overline{A} \right) \left( \frac{\hbar}{i} \text{GRAD} - q\overline{A} \right) \psi + q\phi\psi$$

where ℏ is Planchk's constant divided by $2\pi$, i is the imaginary number $\sqrt{-1}$, $\phi$ is the electric scalar potential experienced by the particle, A is the magnetic scalar potential experienced by the particle and $\chi$ is the wave function of the particle. The Josephson junction is an example of a device, operating on quantum mechanical principles, that is responsive to the magnetic vector potential.

OBJECTS OF THE INVENTION

It is therefore an object of the present invention to provide an improved system for transfer of information.

It is a further object of the present invention to provide a system for the transmission of information that utilizes the magnetic vector potential field.

It is a more particular object of the present invention to provide a system for transmission of information that utilizes the curl-free portion of the magnetic vector potential field.

It is another particular object of the present invention to provide apparatus for generation of magnetic vector potential field and apparatus for detection of the curl-free magnetic vector potential field.

SUMMARY OF THE INVENTION

The aforementioned and other objects are accomplished, according to the present invention, by apparatus for generating a magnetic vector potential field $\overline{A}$ having a substantial component subject to the condition CURL $\overline{A}=0$ (i.e., a curl-free magnetic vector potential field component), and by apparatus for detecting the curl-free magnetic vector potential field. By providing apparatus to modulate the field produced by the apparatus generating the curl-free magnetic vector potential field, and by providing apparatus to demodulate the curl-free field identified by the detecting apparatus, information can be transferred by means of the curl-free magnetic vector potential field.

Examples of the apparatus generating magnetic vector potential fields with substantial curl-free components include solenoidal configurations and toroidal configurations. The Josephson junction device is an example of a device which can detect a curl-free magnetic vector potential field.

These and other features of the present invention will be understood upon reading of the following description along with the drawings.

DESCRIPTION OF THE PREFERRED EMBODIMENT

1. Detailed Description of the Figures

Figure 1:
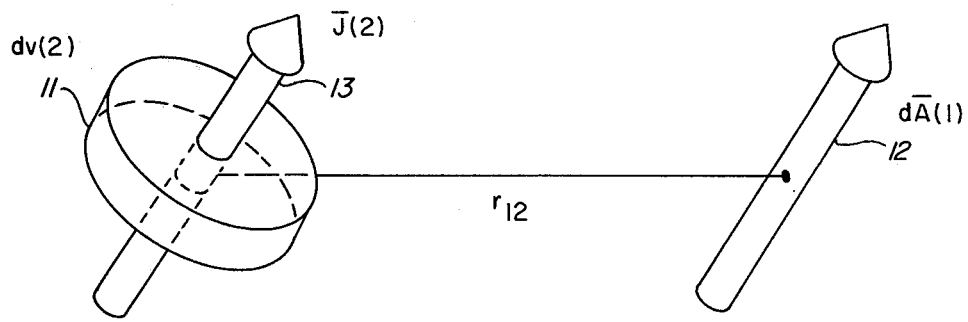
FIG. 1 is a schematic diagram illustrating the procedure for determining a magnetic vector potential at a point.

Referring to FIG. 1, the method of determining the magnetic vector potential field $\overline{A}(1)$ 12 (i.e., at point 1) is illustrated. Referring to equation 6, the contribution by the differential volume element at point 2, dv(2), 11, having a current density $\overline{J}(2)$ 13 associated therewith is given by $$d\overline{a}(1) = \frac{1}{4\pi\epsilon_o C^2} \cdot \frac{\overline{J}(2)}{r_{12}} [dv(2)] \qquad 10.$$

To obtain equation 6, equation 10 must be integrated. Equations 6 and 10 are valid where $\overline{J}$ is not a function of time.

Figure 2:
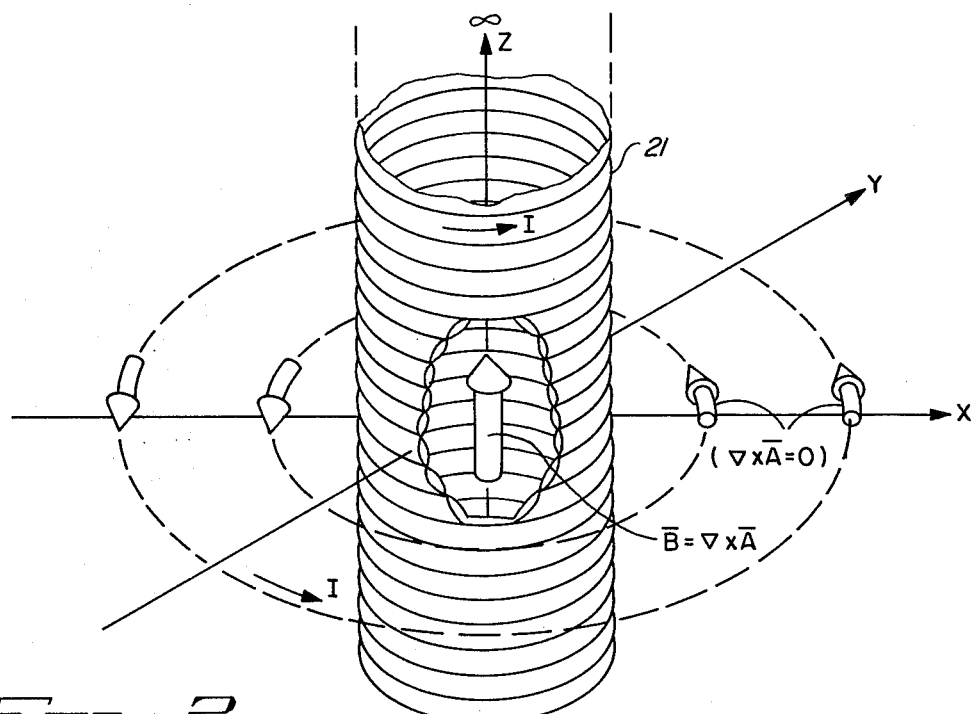
FIG. 2 is a schematic diagram illustrating the generation of a curl-free magnetic vector potential field using an infinite solenoid.

Referring to FIG. 2, an example of current configuration producing a substantial component of curl-free magnetic vector potential field is shown. Conductors carrying a current I are wrapped in a solenoidal configuration 21 extending a relatively great distance in both directions along the z-axis. Within solenoid 21, the magnetic flux density $\overline{B}=$ CURL $\overline{A}$ is a constant directed along the z-axis with a value $$\overline{B} = B_z = \frac{nI}{\epsilon_o C^2} \qquad 11.$$

where n is the number of conductors per unit length. Outside of the solenoid, it can be shown that the components of A 23 are $$A_x = -\frac{nIa^2}{2\epsilon_o C^2} \cdot \frac{y}{x^2+y^2} \qquad 12.$$

$$A_y = \frac{nIa^2}{2\epsilon_o C^2} \cdot \frac{x}{x^2+y^2} \qquad 13.$$

$$A_z = 0 \qquad 14.$$

where a is the radius of the solenoid. It can be shown that CURL $A=0$ for the vector potential field outside of the solenoid 21. To the extent that the solenoid is not infinite along the z-axis, dipole terms (i.e., CURL $A \neq 0$) will be introduced in the magnetic vector potential field.

Figure 3:
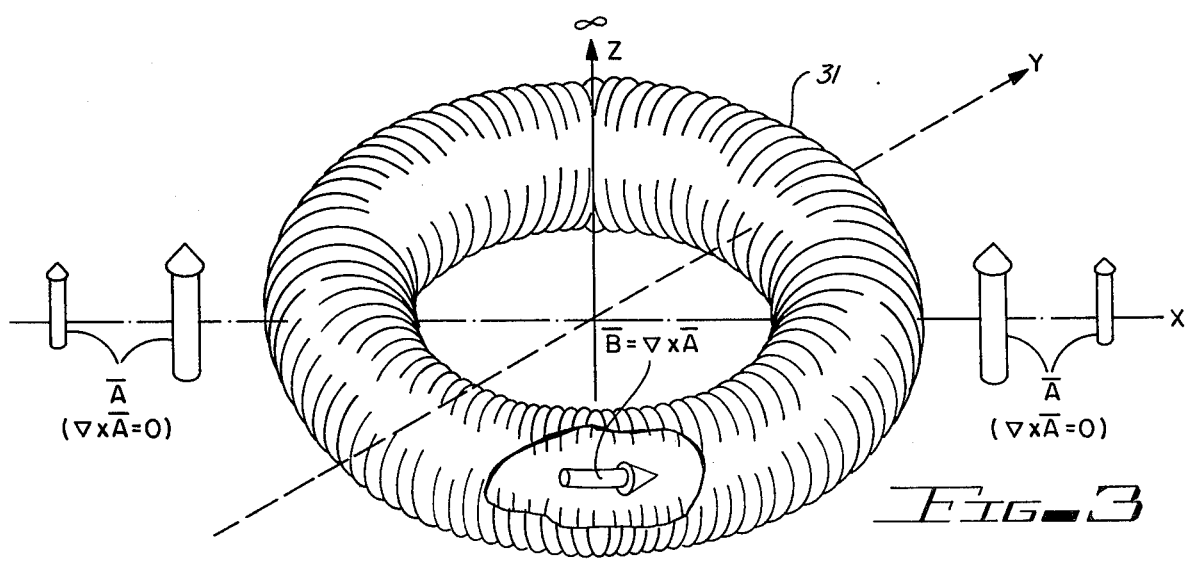
FIG. 3 is a schematic diagram illustrating the generation of a curl-free magnetic vector potential field using a toroidal configuration.

Referring to FIG. 3, another example of a current geometry generating magnetic vector potential field with a substantial curl-free component is shown. In this geometry the current carrying conductors are wrapped uniformly in toroidal configuration 31. Within the toroidal configuration, the magnetic flux, B=CURL A 32 and the magnetic flux, is contained substantially within the torus for A 33. In the region external to the torus, B=CURL A=0 and the orientation of the magnetic vector potential field in the plane of the torus is parallel the axis of the torus.

Figure 4A:
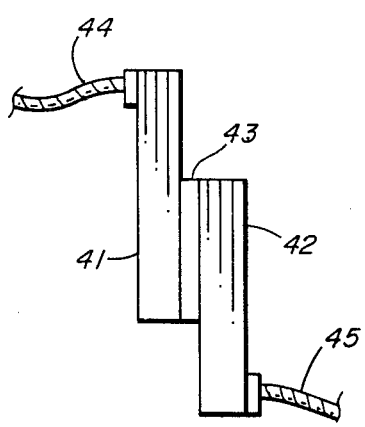
FIG. 4A is a cross-sectional diagram of a Josephson junction device.
Figure 4B:
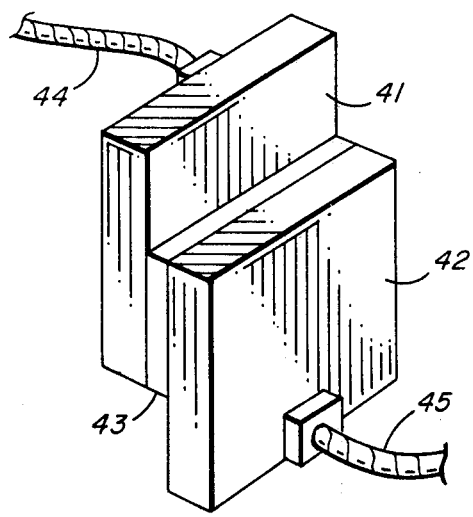
FIG. 4B is a perspective view of a Josephson junction device.

Referring to FIG. 4A and FIG. 4B, the schematic diagram of a detector capable of detecting the curl-free component of the magnetic vector potential field is shown. This detector is referred to as a Josephson junction device. The Josephson junction consists of a first superconducting material 41 and a second superconducting material 42. These two superconducting materials are separated by a thin insulating material 43. Elements 44 and 45 are conducting leads for permitting the flow of current through the junction. According to classical electromagnetic theory, the insulating material 43 will prevent any substantial conduction of electrons between the two superconducting regions. However, quantum theory products, and experiments verify that conduction can take place through the insulating material. The result of this conduction is a net current $$I_{JJ} = K \sin\left(\delta_0 + \frac{2e}{\hbar} \int \overline{A} \cdot d\overline{s} + \frac{e}{\hbar} Vt \right) \quad 15.$$

where the magnitude of the current K and the phase $\delta_0$ are determined by intrinsic properties of the junction device, e is the charge of the electron, $\overline{A}$ is an externally applied magnetic vector potential, $d\overline{s}$ is a differential element extending from one superconducting element to the other superconducting element, t is time, and $\gamma$ is an externally applied voltage. This conduction takes place when leads 44 and 45 are coupled with overflow impedance to the current flow. The component of the magnetic vector potential field A perpendicular to the plane of the junction determines the current $I_{JJ}$. Examples of the use of the Josephson junction as a magnetic field detector have been described in the book "Superconductor Applications: SQUIDS and Machines . . .", Plenum Press 1976 by Brian B. Schwartz and Simon Foneu and in the article by Jakleviz et al Phys. Rev. 140 A 628 (1965).

Figure 5:
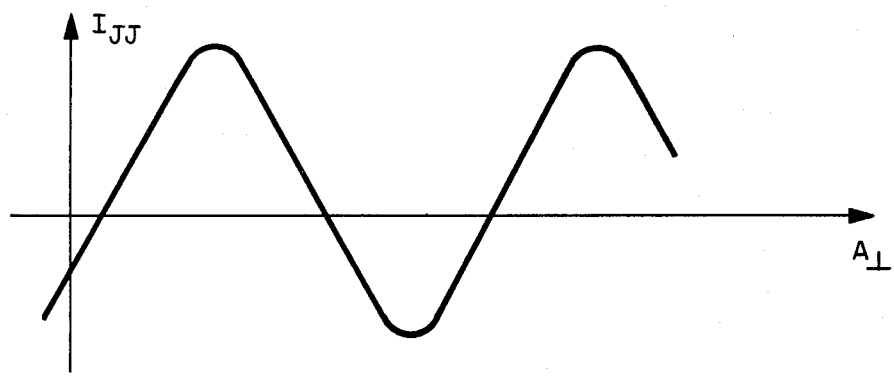
FIG. 5 is a diagram of the current flowing in a Josephson junction as a function of the magnetic vector potential field component perpendicular to the junction surface.

Referring to FIG. 5, the relationship of the Josephson junction device current as a function of externally applied magnetic vector potential field is shown. The integral $\int \overline{A} \cdot d\overline{s}$ as $\overline{A}$ is increased, results in a change of phase for $I_{JJ}$. The dot product of $\overline{A}$ with $d\overline{s}$, where $\overline{s}$ is the length of the junction perpendicular to the junction, results is the phase angle of $I_{JJ}$, being proportional to the component of $\overline{A}$ perpendicular to the junction, $A_1$. This change in phase produces the oscillating behavior for $I_{JJ}$ as a function of a magnetic vector potential field perpendicular to the Josephson junction. This relationship will hold as long as there is no externally applied voltage to the Josephson junction (i.e., V=0).

Figure 6:
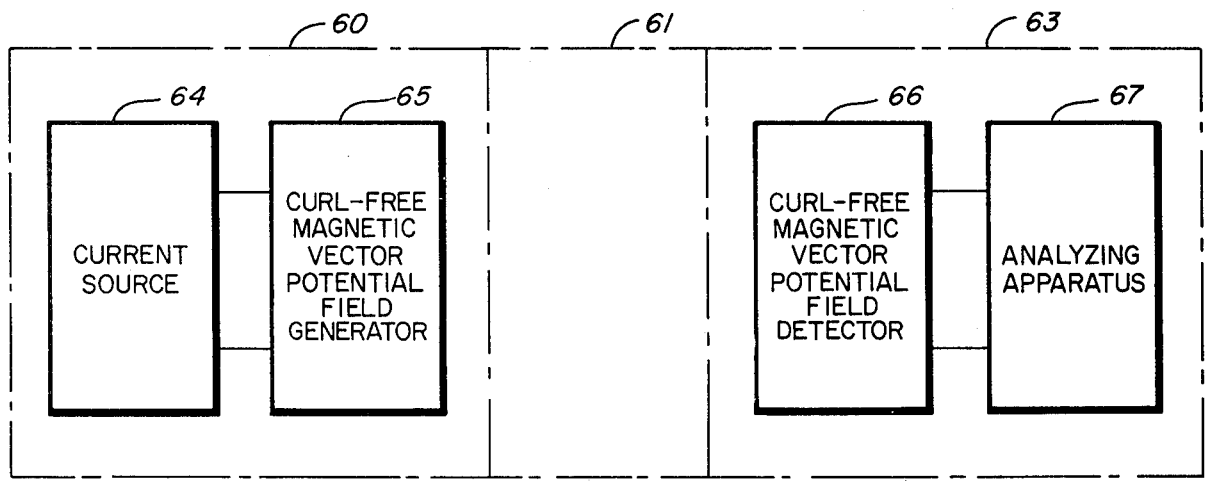
FIG. 6 is a schematic diagram of a system for using a curl-free vector potential radiation field for transmission of information.

Referring next to FIG. 6, a system for the transfer of information using a curl-free vector potential field is shown. Apparatus 60 is comprised of a current source 64 and apparatus 65 configured to generate a magnetic vector potential field having a substantial curl-free component using the current from the current source. The magnetic vector potential field is established in the intervening media 61 and impinges upon a magnetic vector potential field detector 66 of retrieving apparatus 63. The property of detector 66 indicating the presence of a magnetic vector potential field is analyzed in apparatus 67 for information content.

2. Operation of the Preferred Embodiment

In order to transmit information, it is necessary to vary the field carrying the information. No mention has been made in the previous discussion of the effect of modulating the current source. It will be clear that the finite field propagation velocity will cause a delay between a change in the vector potential field produced by the generator of the field and the detection of that change by the detector located at a distance from the generator. However, these delay effects will be ignored in this discussion. With respect to curl-free vector potential field generating apparatus, any limitation on the upper limit of generated frequency components imposed will be the result of parameters impacting rapid changes in the current. Thus parameters such as inductance can provide a limit to ability to impose high frequency modulation on the vector potential field.

With respect to the media between the field generating apparatus and the field detecting apparatus, two effects are important. First as implied by equation (1)

$$\text{CURL } \overline{E} + \frac{\partial \overline{B}}{\partial t} = \text{CURL } \overline{E} + \text{CURL } \frac{\partial \overline{A}}{\partial t} = \quad 16.$$

$$\text{CURL} \left( \overline{E} + \frac{\partial \overline{A}}{\partial t} \right) = 0$$

or $$\frac{\partial \overline{A}}{\partial t} = -\overline{E} \quad 17.$$

Therefore, as modulation is imposed on the vector potential field, the change in the vector potential field will produce an electric field intensity. The electric field intensity will produce a flow of current in conducting material or a temporary polarization in polarizable material. With respect to materials demonstrating magnetic properties, the bulk magnetic properties are responsive to the magnetic flux density $\overline{B}$. However, $\overline{B} = \text{CURL } \overline{A} = 0$ for the curl-free vector potential field component. Therefore, the interaction of the curl-free magnetic vector potential field is weaker in magnetic materials than is true for the general magnetic vector potential field. Media effects and especially the conductivity of the intervening media will provide a mechanism delaying the achievement of steady state condition for the curl-free magnetic vector potential field (i.e., because $\delta \overline{A}/\delta t = -\overline{E}$) field and thus causing a media limitation on frequency. A curl-free magnetic vector potential field can be established in materials that are not capable of transmitting normal electromagnetic radiation. The media delay problem can be compensated for by lowering the frequency spectrum of the modulation on the curl-free magnetic vector potential field.

With respect to the detector, the Josephson junction can be constructed to provide responses of sufficiently high frequency so that this element of the system is not typically a factor limiting frequency of information transfer.

As indicated in equation 12, the effect of the application of a vector potential field to a Josephson junction, in the absence of a voltage applied to the junction, is to change the phase of the sine function determining the value of the junction current $I_{JJ}$. The excursions from zero magnetic vector potential field can be analyzed and a determination made of the modulation applied to the field. When a voltage is applied to the Josephson junction, oscillation occurs in the $I_{JJ}$ as will be seen from the Vdt term of equation 12. The application of an external vector potential field causes the phase of the oscillation to change. By monitoring the phase change in the Josephson junction oscillations, the modulation of the vector potential field can be inferred.

Another method of detection of a magnetic vector potential field utilizes the property that $\delta \overline{A}/\delta t = -\overline{E}$.

Thus, for example, by measuring the changes in a material resulting from the application of the electric field, the magnetic vector potential field causing the electric field can be inferred.

Many changes and modifications in the above-described embodiment of the invention can, of course, be carried out without departing from the scope thereof. Accordingly, the scope of the invention is intended to be limited only by the scope of the accompanying claims.

What is claimed is:

1. A system for transmission of information comprising:
    field generating means responsive to an input signal modulated with said information for generating a magnetic vector potential radiation field having a curl-free component modulated with said information; and
    detector means for detecting said curl-free component of said magnetic vector potential radiation field, said detector producing a signal containing said information.

2. The information transmission of claim 1 wherein said field generating means includes apparatus for applying a current source modulated with said information to configuration of conductors for generating said curl-free magnetic vector potential field.

3. The information transmission system of claim 2 wherein said detector means includes a Josephson junction.

4. The information transmission system of claim 3 wherein a change in phase in the current of said Josephson junction results from a change in said vector potential radiation field.

5. A system for transfer of information comprising:
    field generating means for generating a magnetic vector potential field having a curl-free component;
    modulation means coupled to said field generating means for modulating said magnetic vector potential field with said information;
    detection means for detecting said curl-free component of said generated vector potential field; and
    demodulation means coupled to said detector means for determining said information.

6. A method of transfer of information comprising the steps of:
    (a) generating a magnetic vector potential field having a substantial curl-free component, said substantial curl-free component modulated with said information;
    (b) detecting said substantial curl-free component of said vector potential field; and
    (c) extracting said information from said detected substantial curl-free vector potential field.

7. The method of transfer of information of claim 6 wherein step (a) includes the step modulating a current, said modulated current applied to a configuration of conducting elements producing said modulated substantial curl-free component field.

8. The method of transfer of information of claim 6 wherein step (c) includes detecting of current phase changes in a Josephson junction device.

* * * * *